United States Patent
Rodgers, II (10) Patent No.: US 8,075,437 B2
(45) Date of Patent: Dec. 13, 2011

(54) GEAR ASSEMBLY FOR MULTI-SPEED COUNTERSHAFT TRANSMISSION

(75) Inventor: Dane L. Rodgers, II, Avon, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 600 days.

(21) Appl. No.: 12/182,393

(22) Filed: Jul. 30, 2008

(65) Prior Publication Data

US 2010/0029431 A1 Feb. 4, 2010

(51) Int. Cl.
F16H 37/02 (2006.01)
F16H 3/08 (2006.01)

(52) U.S. Cl. .......................... 475/211; 74/331

(58) Field of Classification Search .................. 74/330, 74/331, 340; 475/218, 302, 303, 317, 329, 475/343
See application file for complete search history.

(56) References Cited

U.S. PATENT DOCUMENTS

| | | | | |
|---|---|---|---|---|
| 3,974,719 A * | 8/1976 | Tiliander | ...................... | 74/665 A |
| 4,070,927 A | 1/1978 | Polak | | |
| 4,614,133 A | 9/1986 | Nerstad et al. | | |
| 4,693,129 A | 9/1987 | Pierce | | |
| 5,041,062 A * | 8/1991 | Dornhoff | ...................... | 474/144 |
| 5,385,064 A | 1/1995 | Reece | | |
| 5,421,216 A * | 6/1995 | Stine | ................ | 74/331 |
| 5,591,097 A | 1/1997 | Petri et al. | | |
| 5,881,600 A * | 3/1999 | Fan | .................. | 74/329 |
| 7,311,630 B2 | 12/2007 | Borgerson | | |
| 7,313,981 B2 | 1/2008 | Gumpoltsberger | | |
| 7,470,206 B2 * | 12/2008 | Rodgers, II | ................... | 475/218 |
| 7,581,461 B2 * | 9/2009 | Matsushita | .................... | 74/333 |
| 7,597,644 B2 * | 10/2009 | Rodgers, II | ................... | 475/218 |
| 7,604,561 B2 * | 10/2009 | Earhart | ........................ | 475/218 |
| 7,748,286 B2 * | 7/2010 | Baldwin | ....................... | 74/330 |
| 7,762,154 B2 * | 7/2010 | Murakami et al. | ............. | 74/331 |
| 7,832,299 B2 * | 11/2010 | Kobayashi et al. | ............. | 74/330 |
| 7,837,589 B2 * | 11/2010 | Earhart | ........................ | 475/218 |
| 7,846,055 B2 * | 12/2010 | Earhart | ........................ | 475/207 |
| 2007/0240530 A1 * | 10/2007 | Ogami et al. | .................... | 74/330 |
| 2007/0277635 A1 * | 12/2007 | Komori | .......................... | 74/340 |
| 2008/0045373 A1 | 2/2008 | Rodgers, II | | |
| 2008/0132377 A1 * | 6/2008 | Miller et al. | .................... | 74/664 |
| 2008/0134818 A1 * | 6/2008 | Gitt | ................. | 74/330 |
| 2008/0161154 A1 | 7/2008 | Bjorck et al. | | |
| 2008/0236317 A1 * | 10/2008 | Matsushita et al. | ............. | 74/340 |
| 2010/0319485 A1 * | 12/2010 | Miller et al. | .................... | 74/664 |

* cited by examiner

Primary Examiner — David D Le
Assistant Examiner — Michael Gonzalez
(74) Attorney, Agent, or Firm — Barnes & Thornburg LLP (57) ABSTRACT

A multi-speed countershaft transmission for a vehicle is provided. The transmission includes a main shaft and countershaft gears that receive input directly from an input member. A plurality of torque transmitting mechanisms may be selectively applied to synchronize a range gear to a countershaft. The countershaft transfers torque to an output gear set, which may transfer torque to a planetary gear set. The available range gears include a plurality of forward speed ratios and at least one reverse speed ratio. One or more power take-off sections may also be provided.

25 Claims, 3 Drawing Sheets

| RANGE | C1 | C2 | C3 | C4 | C5 | C6 | C7 | SYNCHRO |
|---|---|---|---|---|---|---|---|---|
| R2 |  | X |  |  |  |  | X | R |
| R1 | X | X |  |  |  | X |  | R |
| 1 |  |  |  |  |  | X |  | R OR F |
| 2 |  | X |  |  |  | X |  | F |
| 3 |  |  | X |  |  | X |  | R OR F |
| 4 |  |  |  | X |  | X |  | R OR F |
| 5 |  |  |  |  | X | X |  | R OR F |
| 6 | X |  |  |  |  |  | X | R OR F |
| 7 |  | X | X |  |  |  | X | F |
| 8 |  |  |  | X |  |  | X | R OR F |
| 9 |  |  |  |  | X |  | X | R OR F |
| 10 |  |  |  |  |  |  | X | R OR F |

FIG. 3

GEAR ASSEMBLY FOR MULTI-SPEED COUNTERSHAFT TRANSMISSION

TECHNICAL FIELD

The present disclosure relates generally to transmissions for motor vehicles, and more particularly to gear assemblies for multiple speed countershaft transmissions.

BACKGROUND

Motor vehicles are powered by a drive unit, such as an internal combustion engine or an engine-electric motor combination. The drive unit provides a torque output. In vehicles equipped with automatic transmissions, a fluid coupling, such as a torque converter or similar apparatus, transfers the torque from the drive unit to the transmission.

The transmission enables the vehicle to assume a number of different operating modes, ranges, or ratios. In many cases, the transmission provides a number of different forward speed ratios, in addition to neutral and at least one reverse speed ratio.

The transmission includes at least one gear assembly and a plurality of torque transmitting mechanisms such as friction devices, which may include one or more clutches and/or brakes. Typically, an electro-hydraulic control system controls the application or engagement and release or disengagement of the torque transmitting mechanisms, to cause shifts from one range, ratio or mode to another range, ratio or mode in the transmission.

Countershaft transmissions are a type of transmission used in motor vehicles, particularly in commercial vehicles. A variety of countershaft transmissions currently exist. Many currently known countershaft transmissions include a main shaft, and at least one headset gear, which receives torque input from the torque converter turbine or similar apparatus and transfers it to a countershaft. Some existing countershaft transmissions also include a direct shaft, in addition to the main shaft, which bypasses the countershafts and supplies input directly to an output planetary gearset.

SUMMARY

According to one aspect of the present invention, this disclosure describes a transmission for use in a vehicle powertrain, where the powertrain includes a drive unit configured to provide rotational power and a torque transferring apparatus interposed between the transmission and the drive unit. The transmission includes a main shaft having an input end, an output end spaced from the input end, and at least one main shaft gear positioned between the input end and the output end for common rotation with the main shaft. The input end of the main shaft is configured to receive torque output from the torque transferring apparatus. At least one countershaft is spaced from and substantially parallel to the main shaft. At least one countershaft gear is selectively rotatable about the at least one countershaft and intermeshing with a main shaft gear. An output gear set is also included, which provides a first output gear concentric with and rotatable about the output end of the main shaft and at least one second output gear coupled for common rotation with the at least one countershaft and intermeshing with the first output gear. The first and second output gears are configured to multiply torque received from the at least one countershaft at the output end of the main shaft.

The transmission may include a planetary gear set concentric with and rotatable about the output end of the main shaft. The planetary gear set may be configured to receive torque output from the output gear set and to output torque to an output member, wherein the output member is configured to drive a vehicle load. The output member may have an output member axis and the main shaft may have a main shaft axis. The output member axis and the main shaft axis may be generally aligned.

The input end of the main shaft may be directly connected to a first end of a transmission input shaft. A second end of the transmission input shaft may be connected to the torque transferring apparatus. The transmission input shaft may have a transmission input shaft axis. The transmission input shaft axis, the main shaft axis, and the output member axis may be generally aligned.

The transmission may include a plurality of torque transmitting mechanisms, at least one of which is configured to selectively couple the at least one countershaft gear to the at least one countershaft for common rotation with the at least one countershaft and at least one of which is configured to selectively couple a portion of the planetary gear set for common rotation with at least one of the main shaft and the first output gear of the output gear set. One of the torque transmitting mechanisms may be shared by at least one reverse speed ratio and at least one forward speed ratio. The transmission may include a reverse idler and a synchronizer, which may be concentric with and rotatable about a countershaft to provide the at least one reverse speed ratio.

According to another aspect of the present invention, a transmission for use in a vehicle powertrain is provided. The transmission includes a main shaft having an input end and an output end spaced from the input end, a countershaft spaced from and substantially parallel to the main shaft, and a first gear set spaced from the input end of the main shaft by a first distance. The first gear set comprises a first main shaft gear concentric with and coupled for common rotation about the main shaft and a first countershaft gear concentric with and rotatable about the countershaft. The first countershaft gear is coplanar with and intermeshing the first main shaft gear.

The transmission also includes a first torque transmitting mechanism supported by the countershaft and engageable to selectively couple the first countershaft gear for common rotation with the countershaft.

The transmission also includes a second gear set spaced from the input end of the main shaft by a second distance. The second distance is greater than the first distance. The second gear set comprises a first gear concentric with and rotatable about the main shaft and a second gear coupled for common rotation with the countershaft. The second gear is coplanar with and continuously intermeshing the first gear of the second gear set. The second gear set is operably coupled to an output member configured to drive a vehicle load.

The first gear of the second gear set may be coupled for common rotation with a first end of a sleeve shaft and the sleeve shaft may be concentric with and rotatable about the main shaft. The sleeve shaft may have a second end spaced from the first end, and the second end of the sleeve shaft may be coupled for common rotation with a hub member of a planetary gear set.

The planetary gear set may be spaced from the input end of the main shaft by a third distance, and the third distance may be greater than the second distance. The output member may be coupled for common rotation with a carrier member of the planetary gear set.

The transmission may include a second torque transmitting mechanism supported by the hub member of the planetary gear set. The second torque transmitting mechanism may be engageable to selectively couple the planetary gear set for common rotation with the first gear of the second gear set. The transmission may include a third torque transmitting mechanism engageable to selectively couple the planetary gear set for common rotation with the main shaft. The transmission may be configured so that there are no gear sets that have a distance from the input end of the main shaft less than the first distance.

The transmission may include a second countershaft spaced from and substantially parallel to the main shaft and the first countershaft. The first gear set may include a second countershaft gear concentric with and rotatable about the second countershaft. The second countershaft gear may be coplanar with the first main shaft gear and the first countershaft gear.

According to another aspect of the present invention, a vehicle transmission is provided, including a main shaft having an input end and an output end spaced from the input end, where the input end is directly connectable to a transmission input. The transmission includes a plurality of main shaft gears connected for common rotation with the main shaft, first and second countershafts spaced from and substantially parallel to the main shaft, and a plurality of first countershaft gears concentric with and rotatable about the first countershaft. Each of the first countershaft gears is coplanar with and continuously intermeshing a main shaft gear. The transmission also includes a reverse idler gear coplanar with and continuously intermeshing a main shaft gear, and a plurality of second countershaft gears concentric with and rotatable about the second countershaft. Each of the second countershaft gears is coplanar with a main shaft gear, and at least the first countershaft gears are driven by the transmission input.

The transmission may include a plurality of torque transmitting mechanisms and a synchronizer actuatable to provide a plurality of forward speed ratios and a reverse speed ratio between the input end and the output end of the main shaft. The transmission may include an output gear set and a planetary gear set. Each of the output gear set and planetary gear set may be concentric with and rotatable about the output end of the main shaft to double the number of speed ratios provided between the input end and the output end of the main shaft. The transmission may include first and second countershaft gears continuously intermeshing first and second main shaft gears and third and fourth countershaft gears continuously intermeshing third and fourth main shaft gears. The transmission may include a plurality of power take-off locations between the input end and the output end of the main shaft Patentable subject matter may include one or more features or combinations of features shown or described anywhere in this disclosure including the written description, drawings, and claims.

BRIEF DESCRIPTION OF THE DRAWINGS

The detailed description refers to the following figures in which.

DETAILED DESCRIPTION

Aspects of the present invention are described with reference to certain illustrative embodiments shown in the accompanying drawings and described herein. While the present invention is described with reference to the illustrative embodiments, it should be understood that the present invention as claimed is not limited to the disclosed embodiments.

Figure 1:
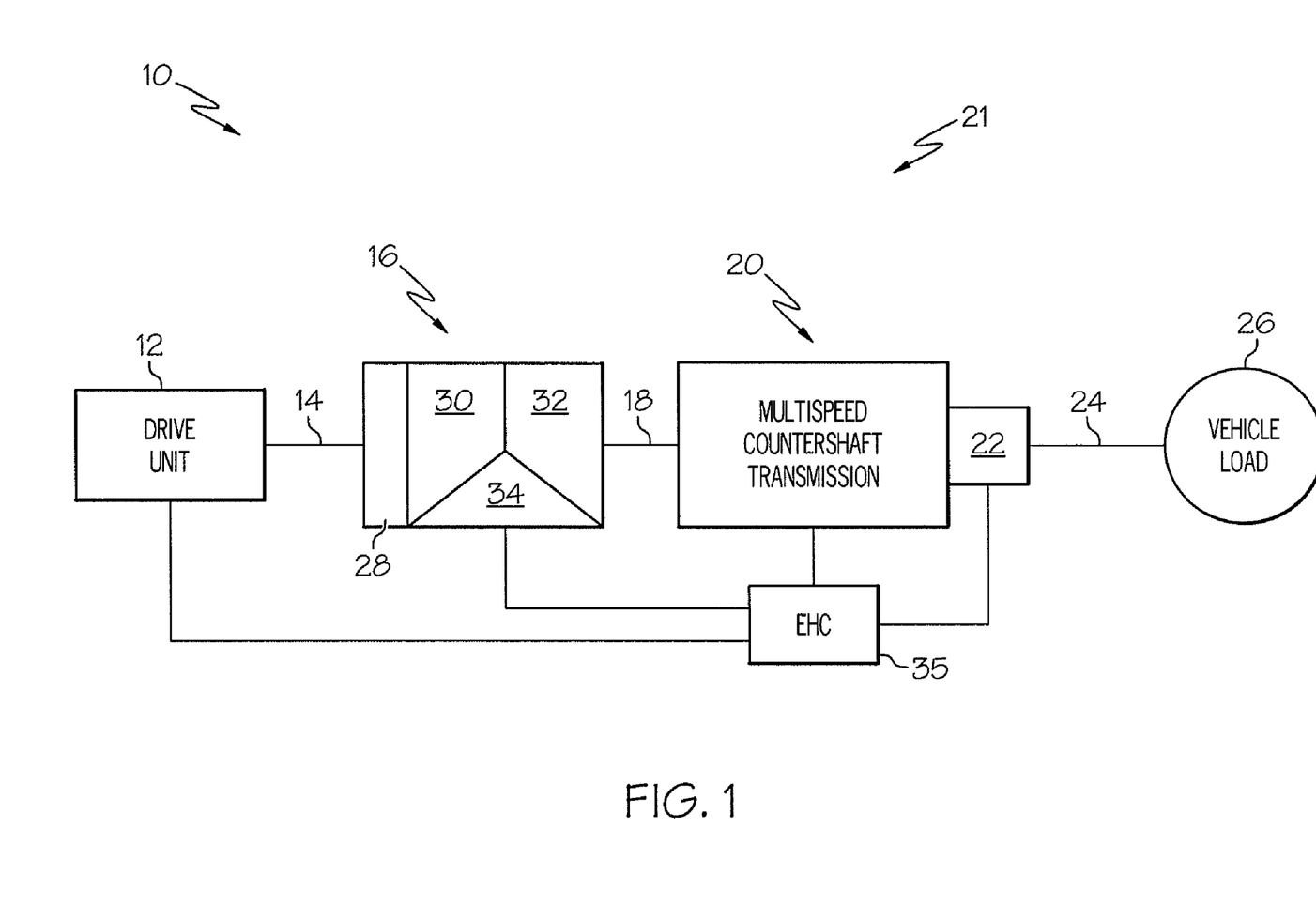
FIG. 1 is a simplified schematic diagram of a vehicle powertrain including a multi-speed countershaft transmission gear assembly, wherein the gear assembly is operably coupled to a transmission input member at an input end, a rear planetary gearset at an output end, and an electro-hydraulic control.

This disclosure describes a gear assembly 20 for a countershaft transmission 21 of a vehicle. In FIG. 1, gear assembly 20 is depicted in the context of an exemplary automotive vehicle powertrain 10. It will be understood by those of ordinary skill in the art, however, that aspects of the present invention are applicable to other types of powertrain configurations.

The exemplary powertrain 10 includes a drive unit 12, a torque transferring apparatus 16, and transmission 21. Drive unit 12 provides torque output to shaft 14. Drive unit 12 may be an internal combustion engine of a compression-ignition type (i.e. diesel) or a spark-ignition type (i.e. gasoline), a "hybrid" engine-electric motor combination, or other source of rotational power.

Torque transferring apparatus 16 selectively establishes a coupling between drive unit 12 and transmission 21 to convert and/or transfer torque output from drive unit 12 to the vehicle transmission 21. In the exemplary powertrain 10, torque transferring apparatus 16 is a torque converter and includes a torque converter clutch 28, a pump 30, a turbine 32 and a stator 34. Torque may be multiplied between the pump 30 and the turbine 32 when the torque converter clutch 28 is not applied, as is well known. Turbine 32 outputs torque to transmission 21. While the exemplary powertrain 10 depicts a torque converter 16, it will be understood by those skilled in the art that other types of fluid couplings or similar apparatus may be used. In any event, torque transferring apparatus 16 outputs torque to shaft 18, which is the transmission input shaft or input member.

Transmission 21 has a plurality of operating modes, ranges or ratios, including at least one forward speed ratio, neutral and at least one reverse speed ratio. More particularly, in the illustrated embodiment, transmission 21 is operable to provide up to ten forward speed ratios and up to two reverse speed ratios. The up to ten forward speed ratios are provided by at least one direct range, a plurality of countershaft ranges and a plurality of planetary ranges. In the embodiment shown in FIG. 2, there are four countershaft ranges (C1, C2, C3 and C5), one direct range (C4) and two planetary ranges (C6 and C7). Thus, in the illustrated embodiment, the main shaft is effectively also the direct shaft, thereby eliminating the need for a separate direct shaft.

Figure 3:
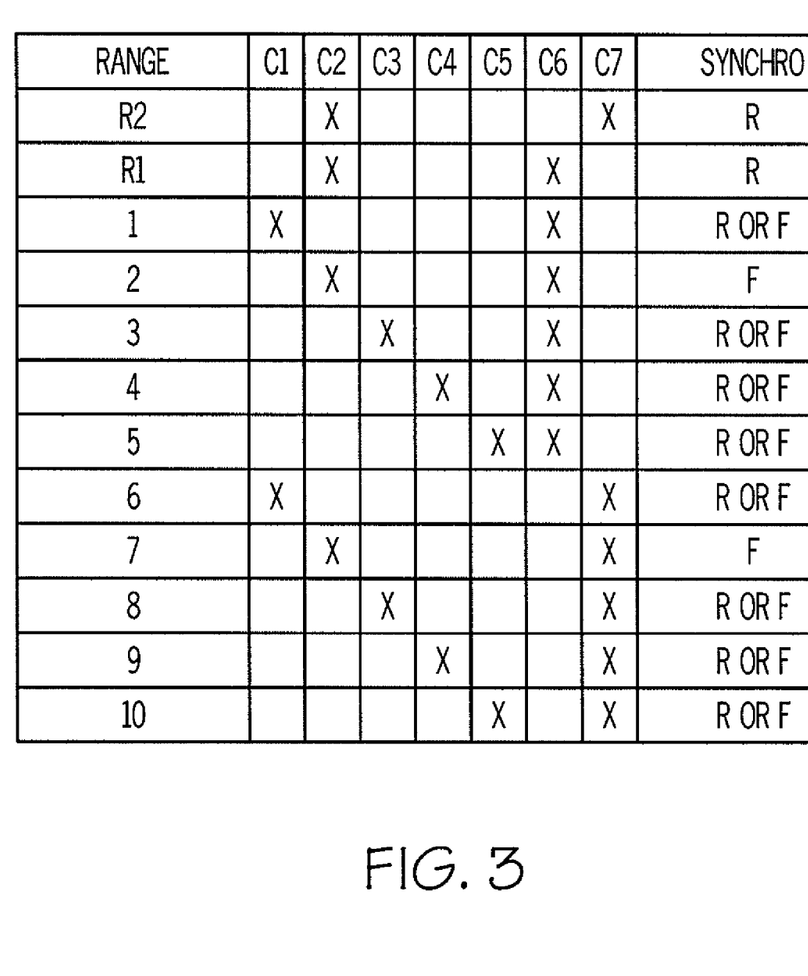
FIG. 3 is a table illustrating one example of how torque transmitting mechanisms may be applied to achieve a plurality of forward speed ratios and at least one reverse speed ratio in a transmission including a gear assembly provided in accordance with the present invention.

The countershaft ranges are attained by selectively applying the countershaft torque transmitting mechanisms, i.e., C1, C2, C3, and C5. The planetary ranges are attained by selectively applying the planetary torque transmitting mechanisms, i.e., C6 and C7, and the direct range is attained by selectively applying the direct torque transmitting mechanism, C4. One example of how torque transmitting mechanisms C1, C2, C3, C4, C5, C6 and C7 may be applied to achieve ten forward ratios and two reverse ratios is shown by the table of FIG. 3, which is described below. One of ordinary skill in the art will understand, however, that shift sequences may be modified or eliminated to obtain a particularly desired number of ratios, and that the gear ratios themselves may be modified. For example, shift sequences may be modified so that a range is skipped, thereby resulting in fewer forward speed ratios (i.e., nine instead of ten). Accordingly, aspects of the present invention are not limited to any particular configuration of shift sequences or to any specific set of gear ratios.

An electro-hydraulic control 35 controls the application and release of torque transmitting mechanisms (i.e. clutches, brakes, synchronizers and the like) of transmission 21 to accomplish shifting from one operating mode, range, or ratio to another operating mode, range or ratio. Such shifting may be commanded by electro-hydraulic control 35 in response to inputs such as drive unit speed (e.g., engine speed), transmission input speed, gear ratio, throttle position, driver requested torque, transmission output speed, and/or other factors.

Transmission 21 includes countershaft gear assembly 20 and a rear planetary gearset 22. Gear assembly 20 receives torque input via input shaft or member 18, as indicated by arrows 110, 112 of FIG. 2. Countershaft gear assembly 20 outputs torque to rear planetary gearset 22, as indicated by arrows 114, 116, 118. Rear planetary gearset 22 outputs torque to shaft or output member 24, as indicated by arrow 120, to drive a vehicle load 26.

Vehicle load 26 generally includes the drive wheels and driven load mass of the vehicle. The weight and other characteristics of vehicle load 26 may be quite considerable and/or vary considerably over the course of the vehicle's use, as may be the case with commercial vehicles such as trucks, buses, emergency vehicles, and the like. Vehicle load 26 may also include ancillary power-driven devices such as hydraulic lifts, towing apparatus and other equipment or features, such as those typically carried by special utility vehicles such as delivery trucks, tow trucks, snow plows, fire trucks, garbage trucks, buses, and the like. Such features may be driven by one or more power take-off (PTO) sections of transmission 21.

Figure 2:
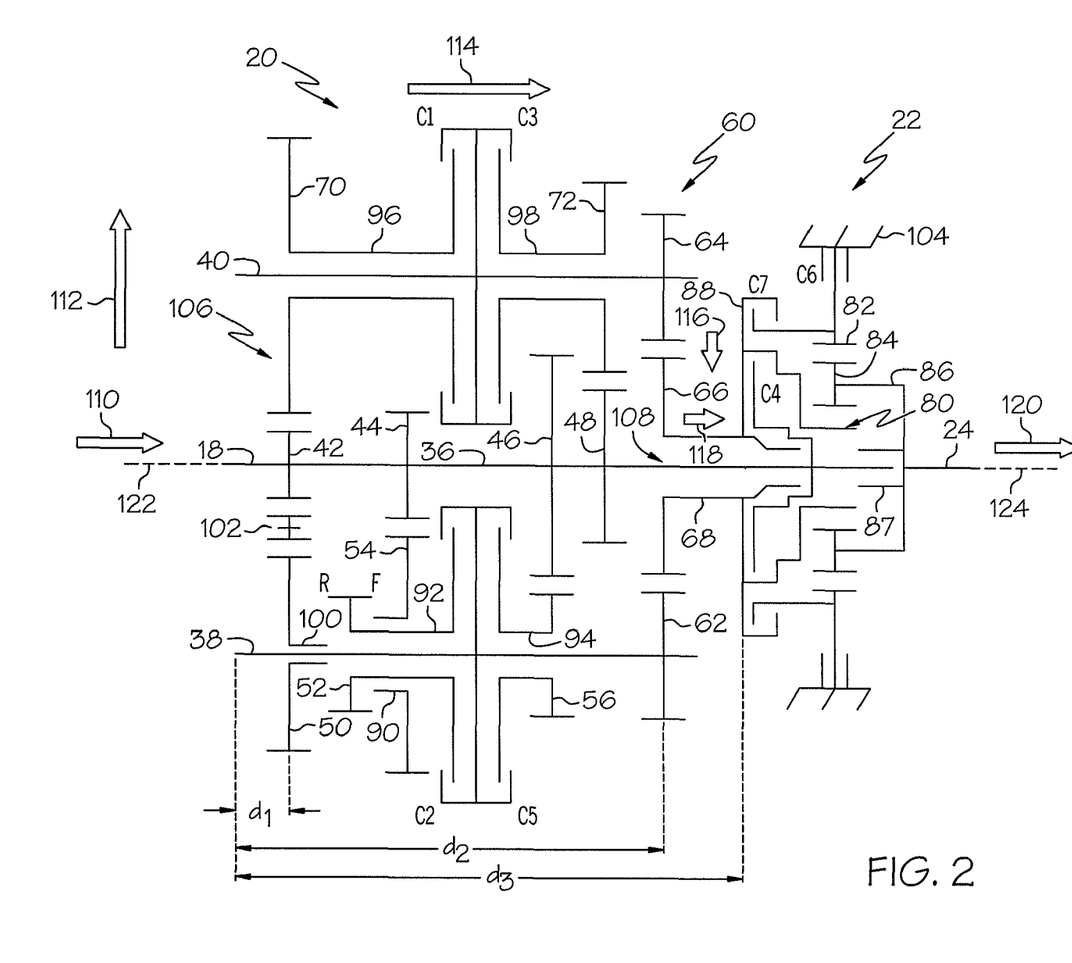
FIG. 2 is a schematic diagram of one embodiment of a multi-speed countershaft transmission gear assembly in accordance with the present invention, showing connection of the input member to a main shaft and countershaft gears and an output gear set spaced from the input member; also showing connection of the countershaft output to a rear planetary gearset.

As shown in FIG. 2, countershaft gear assembly 20 does not require any headset gears or head gear sets. Instead, main shaft 36 is directly coupled to input member 18 for common rotation therewith. As a result, countershaft gears 54, 56, 70, 72 intermesh directly with main shaft gears 44, 46, 42, 48, and are thereby input (turbine) driven. Also, the need for a direct shaft in addition to main shaft 36 is eliminated.

Direct coupling of the main shaft 36 and counter shaft gears 54, 56, 70, 72 to input member 18 enables or facilitates a variety of power take-off (PTO) options, which may be turbine driven as a result of this configuration. In the illustrated embodiment, any of the gear elements 42, 44, 46, 48, 50, 54, 56, 70, 72, or 102 may be used as a turbine driven PTO by intermeshing a PTO gear therewith. As such, transmission 21 does not restrict PTO applications to any particular location of gear assembly 20.

The lack of need for a direct shaft in addition to a main shaft may reduce the overall part count for the countershaft gear assembly 20, relative to other known countershaft gear assemblies. Benefits of the presently disclosed configuration may include reduced overall length, weight and cost of the transmission. Additionally, the elimination of a separate direct shaft may reduce torsional effects.

In addition to main shaft 36, countershaft gear assembly 20 includes first and second countershafts 38, 40 and a reverse idler 102. Countershafts 38, 40 and reverse idler 102 are spaced from and generally parallel to main shaft 36. However, main shaft 36, countershafts 38, 40, and reverse idler 102 are not required to be coplanar, although some or all of these elements may be coplanar in certain embodiments. For example, in one embodiment, countershafts 38, 40 are substantially coplanar with each other but main shaft 36 and reverse idler 102 are not coplanar with countershafts 38, 40 and are also not coplanar with each other. In other words, the spacing and configuration of main shaft 36, countershafts 38, 40, and reverse idler 102 is adaptable to varying packaging and gear arrangement requirements, and the described configuration is just one example of many possible spacing configurations of these elements.

Gear assembly 20 has a plurality of main shaft gears 42, 44, 46, 48, each of which is coupled for common rotation with main shaft 36. Gear assembly 20 also has a plurality of range gears 50, 54, 56, 70, 72, which are operable to enable transmission 21 to achieve a plurality of forward and reverse speed ratios via selective application of torque transmitting mechanisms C1, C2, C3, C4, C5, C6, C7 and synchronizer 52, as described herein.

First countershaft 38 has a plurality of countershaft range gears 50, 54, and 56, and a synchronizer 52, each of which is rotatable about and concentric with first countershaft 38. Second countershaft 40 has a plurality of countershaft gears 70, 72, each of which is rotatable about and concentric with second countershaft 40.

Gears 42, 44, 46, 48 of main shaft 36 are intermeshable with countershaft gears 70, 54, 56, 72, respectively. In general, the countershaft gears that mesh with main shaft gears are input (i.e. turbine) driven in the illustrated embodiment.

Main shaft gear 42 also intermeshes with reverse idler 102. Countershaft gear 50 uses idler 102 and synchronizer 52 to provide the one or more reverse ranges. Synchronizer 52 is movable in direction 'R' to achieve a reverse range and is movable in direction 'F' to achieve a forward range. Movement of synchronizer 52 in direction 'R' couples sleeve shaft or C2 clutch hub 92 with sleeve shaft 100 for common rotation therewith. Movement of synchronizer 52 in direction 'F' couples sleeve shaft or C2 clutch hub 92 with sleeve shaft 90 for common rotation therewith.

Main shaft gear 44 intermeshes with first countershaft gear 54. First countershaft gear 54 is supported by and rotatable about first countershaft 38 with sleeve shaft 90. Main shaft gear 46 intermeshes with first countershaft gear 56. First countershaft gear 56 is supported by and rotatable about first countershaft 38 with sleeve shaft or C5 clutch hub 94.

Main shaft gear 42 also intermeshes with second countershaft gear 70. Second countershaft gear 70 is supported by and rotatable about second countershaft 40 with sleeve shaft or C1 clutch hub 96. Main shaft gear 48 intermeshes with second countershaft gear 72. Second countershaft gear 72 is supported by and rotatable about second countershaft 40 with sleeve shaft or C3 clutch hub 98.

Gear assembly 20 has an input end 106 near input member 18 and an output end 108 near output gear assembly 60. Each of main shaft 36 and countershafts 38, 40 has an input end near or generally aligned with the input end 106 and an output end near or generally aligned with the output end 108 of gear assembly 20.

Output gearset 60 is disposed near output end 108, between the countershaft gears and rear planetary gearset 22. In the embodiment of FIG. 2, countershaft gears 70 and 50 are positioned a first distance $d_1$ from the input end 106 of main shaft 18, output gear set 60 is positioned a second distance $d_2$ from input end 106, and planetary gearset 22 is positioned a third distance $d_3$ from input end 106. Second distance $d_2$ is greater than first distance $d_1$, and third distance $d_3$ is greater than second distance $d_2$.

Output gearset 60 includes gears 62, 64, 66. Gear 62 is concentric with and coupled for common rotation with first countershaft 38. Gear 64 is concentric with and coupled for common rotation with second countershaft 40. Gear 66 continuously intermeshes with gears 62 and 64. Gear 66 is supported on and rotatable with countershaft output member 68. Countershaft output member 68 is concentric with and rotatable about main shaft 36.

Output gear set 60 provides torque multiplication at or near the output end 108, rather than at or near the input end 106, of gear assembly 20. Also, by eliminating the need for head gear sets and providing torque multiplication near output end 108, torque may be reduced in many or most of the countershaft gears and may result in a net reduction in the overall length of the countershaft gear assembly 20 from input end 106 to output end 108.

Input member 18 has an axis 122 and output member 24 has an axis 124. Axes 122, 124 may be generally aligned, as shown in FIG. 2, for example. Main shaft 36 also has an axis (not shown), which is generally aligned with at least axis 122. In the illustrated embodiment, the axis of main shaft 36 is generally aligned with both of axes 122, 124. Accordingly, the illustrated embodiment of transmission 21 may be referred to as an "in-line" transmission. Many in-line transmissions are used with rear-wheel drive vehicles. However, one of ordinary skill in the art will understand that transmission 21 may be adapted for use with vehicles that have rear-wheel, front-wheel or all-wheel drive capabilities, and that aspects of the present invention are applicable to other types of countershaft transmissions.

Transmission 21 includes a plurality of torque transmitting mechanisms. In the illustrated embodiment, countershaft gear assembly 20 includes four torque transmitting mechanisms, C1, C2, C3 and C5, while planetary gear assembly 22 includes three torque transmitting mechanisms C4, C6, and C7. C1 is a rotating clutch supported on the second countershaft 40 and is selectively engageable to couple gear 70 for common rotation with second countershaft 40. C2 is a rotating clutch supported on the first countershaft 38 and is selectively engageable to couple gear 54 for common rotation with first countershaft 38 when synchronizer 52 is in the 'F' position. When synchronizer 52 is in the "R' position, torque transmitting mechanism C2 engages gear 50.

C3 is a rotating clutch supported on the second countershaft 40 and is selectively engageable to couple gear 72 for common rotation with second countershaft 40. C5 is a rotating clutch supported on the first countershaft 38 and is selectively engageable to couple gear 56 for common rotation with first countershaft 38.

By applying any of the clutches C1, C2, C3, C5, which synchronize a gear to a countershaft 38, 40, the respective countershaft 38, 40 then transfers torque to the output gear set 60. The output gear set 60 then provides torque input to the planetary gear set 22.

C4 is a bypass or direct drive clutch that is selectively engageable to couple main shaft 36 for common rotation with hub member 88, bypassing the first and second countershaft members 38, 40. When C4 is engaged, torque is transferred directly from input member 18 to planetary gear set 22. In this way, the need for a direct shaft in addition to the main shaft is eliminated.

C7 is a rotating or "lock-up" clutch that is selectively engageable to cause the entire planetary gear set 22 to rotate at the same speed as output gear 66 via shaft 68 and hub member 88. When C7 is engaged, two members of planetary gearset 22 are connected for common rotation.

C6 is a brake, grounded clutch, or stationary clutch. C6 is selectively engageable to couple the ring gear 82 with the transmission housing 104 or other stationary member, thereby holding the ring gear 82 stationary while other members of the planetary gearset 22 rotate.

Each of torque transmitting mechanisms C1, C2, C3, C4, C5, C6, and C7 can be spaced and configured independently of the other. The spacing and configuration requirements of C1, C2, C3, C4, C5, C6, and C7 may be determined by other requirements of transmission 21, such as countershaft spacing requirements.

Rear planetary gearset 22 generally acts as a two-speed module, providing a first speed when torque transmitting mechanism C6 is applied and a second speed when torque transmitting mechanism C7 is applied. The ratio through the planetary gearset 22 depends on whether C6 or C7 is applied.

Rear planetary gearset 22 is disposed between gear assembly 20 and output member 24. Rear planetary gearset 22 includes a sun gear 80, a ring gear 82, a plurality of pinion or planet gears 84 and a pinion gear carrier 86, which is coupled for common rotation with output member 24. Rear planetary gearset 22 is coupled to countershaft output member 68 via a hub member 88. A rear support 87 supports main shaft 36, and as such, rear support 87 may be a bushing, bearing, or the like.

Rear planetary gear set 22 operates with the ring gear grounded, the sun gear receiving input from the countershafts, and the carrier providing output, or with at least two components locked to give a one to one ratio, as is well known. One of ordinary skill in the art will understand that aspects of the present invention may be applied to countershaft transmissions with or without a planetary gear set.

FIG. 3 is a table showing one example of how the shift sequences of transmission 21 may be configured for operation. In the first column, R1 and R2 are reverse ranges, and there are ten forward ranges. The torque transmitting mechanisms that are applied in each range are marked with an "X". The position of synchronizer 52 (R or F) is indicated in the last column of the table.

In the example of FIG. 3, torque transmitting mechanism C2 is applied to achieve a reverse range, when synchronizer 52 is in the "R" position. A first reverse speed ratio, R1, is achieved when torque transmitting mechanisms C2 and C6 are applied and synchronizer 52 is in the "R" position. A second reverse speed ratio, R2, is achieved when torque transmitting mechanisms C2 and C7 are applied and synchronizer 52 is in the "R" position.

Torque transmitting mechanism C2 is also used to achieve the second and seventh forward ranges, when synchronizer 52 is moved to the 'F' position. To achieve the second forward speed ratio, torque transmitting mechanisms C2 and C6 are applied and synchronizer 52 is in the "F" position. To achieve the seventh forward speed ratio, torque transmitting mechanisms C2 and C7 are applied and synchronizer 52 is in the "F" position. In this way, torque transmitting mechanism C2 is shared by forward and reverse ratios, depending on the position of synchronizer 52. However, reverse range could share any of torque transmitting mechanisms C1, C3, or C5 with a forward range in a similar manner, depending on the gear ratios that are desired. In other words, reverse is not limited to sharing with any specific range gear, except by the desired gear ratios.

When the shared torque transmitting mechanism (C2, in the example of FIG. 3) is not applied, synchronizer 52 may be in either the "R" or the "F" position, or in a neutral position therebetween. In other words, in the illustrated embodiment, two torque transmitting mechanisms are applied independently of synchronizer 52 in any range, except for the shared ranges (in which synchronizer 52 is actuated, in addition to two torque transmitting mechanisms).

The shift sequences shown in FIG. 3 are illustrative; they can be modified depending on the particular gear ratios desired. For example, torque transmitting mechanism C5 could be applied before torque transmitting mechanism C4 (in which case the numbering of C4 and C5 would likely be reversed). In this situation, the direct range (i.e., C4) would be run in the fifth and tenth ranges instead of the fourth and ninth ranges.

The present disclosure describes patentable subject matter with reference to certain illustrative embodiments. The drawings are provided to facilitate understanding of the disclosure, and may depict a limited number of elements for ease of explanation. Except as may be otherwise noted in this disclosure, no limits on the scope of patentable subject matter are intended to be implied by the drawings. Variations, alternatives, and modifications to the illustrated embodiments may be included in the scope of protection available for the patentable subject matter.

The invention claimed is:

1. A transmission for use in a vehicle powertrain including a drive unit configured to provide rotational power and a torque transferring apparatus interposed between the transmission and the drive unit, the transmission comprising
   a main shaft having an input end, an output end spaced from the input end, and a plurality of main shaft gears positioned between the input end and the output end for common rotation with the main shaft, the input end of the main shaft being configured to receive torque output from the torque transferring apparatus,
   a first countershaft spaced from and substantially parallel to the main shaft,
   a second countershaft spaced from and substantially parallel to the main shaft,
   a plurality of countershaft gears, and
   an output gear set comprising a first output gear concentric with and rotatable about the output end of the main shaft and at least one second output gear coupled for common rotation with one of the first countershaft and the second countershaft and meshing with the first output gear, the first and second output gears being configured to multiply torque received from one of the first countershaft and the second countershaft at the output end of the main shaft,
   wherein the plurality of countershaft gears includes a first countershaft gear, a second countershaft gear, a third countershaft gear, and a fourth countershaft gear,
   the plurality of main shaft gears includes a first main shaft gear, a second main shaft gear, a third main shaft gear, and a fourth main shaft gear, and
   the first and the second countershaft gears directly mesh with the first and the second main shaft gears and the third and the fourth countershaft gears directly mesh with the third and the fourth main shaft gears.

2. The transmission of claim 1, comprising a reverse idler intermeshing with one of the at least one main shaft gears and a synchronizer concentric with and rotatable about a countershaft to provide the at least one reverse speed ratio.

3. The transmission of claim 1, wherein each of the at least one main shaft gears intermeshes with only one of the at least one countershaft gears.

4. The transmission of claim 1, comprising a planetary gear set concentric with and rotatable about the output end of the main shaft, the planetary gear set being configured to receive torque output from the output gear set and to output torque to an output member, wherein the output member is configured to drive a vehicle load.

5. The transmission of claim 4, wherein the output member has an output member axis and the main shaft has a main shaft axis, and the output member axis and the main shaft axis are generally aligned.

6. The transmission of claim 5, wherein the input end of the main shaft is directly connected to a first end of a transmission input shaft, a second end of the transmission input shaft is connected to the torque transferring apparatus, the transmission input shaft has a transmission input shaft axis, and the transmission input shaft axis, the main shaft axis, and the output member axis are generally aligned.

7. The transmission of claim 6, comprising a plurality of torque transmitting mechanisms, at least one of which is configured to selectively couple the at least one countershaft gear to the at least one countershaft for common rotation with the at least one countershaft and at least one of which is configured to selectively couple a portion of the planetary gear set for common rotation with at least one of the main shaft and the first output gear of the output gear set.

8. The transmission of claim 7, wherein one of the torque transmitting mechanisms is shared by at least one reverse speed ratio and at least one forward speed ratio.

9. A transmission for use in a vehicle powertrain, the transmission comprising
   a main shaft having an input end and an output end spaced from the input end,
   a first countershaft spaced from and substantially parallel to the main shaft,
   a second countershaft spaced from and substantially parallel to the main shaft,
   a first gear set spaced from the input end of the main shaft by a first distance, the first gear set comprising a first main shaft gear concentric with and coupled for common rotation about the main shaft and a first countershaft gear concentric with and rotatable about the first countershaft, the first countershaft gear being coplanar with and intermeshing the first main shaft gear,
   a first torque transmitting mechanism supported by the first countershaft and engageable to selectively couple the first countershaft gear for common rotation with the first countershaft, and
   a second gear set spaced from the input end of the main shaft by a second distance, the second distance being greater than the first distance, the second gear set comprising a first gear concentric with and rotatable about the main shaft, a second gear coupled for common rotation with the first countershaft, and a third gear coupled for common rotation with the second countershaft, the second gear and the third gear being coplanar with and continuously intermeshing the first gear of the second gear set, the second gear set being operably coupled to an output member configured to drive a vehicle load,
   wherein the first gear of the second gear set is coupled for common rotation with a first end of a sleeve shaft and the sleeve shaft is concentric with and rotatable about the main shaft.

10. The transmission of claim 9, wherein the first gear of the second gear set is the only gear coupled with the sleeve shaft and intermeshing with a gear coupled for common rotation with the first countershaft or the second countershaft.

11. The transmission of claim 9, wherein the first gear set comprises a second countershaft gear concentric with and rotatable about the second countershaft, and the second countershaft gear is coplanar with the first main shaft gear and the first countershaft gear.

12. The transmission of claim 11, wherein the first gear set further comprising a reverse idler gear intermeshing with the first main shaft gear and with the second countershaft gear.

13. The transmission of claim 9, wherein the sleeve shaft has a second end spaced from the first end, and the second end of the sleeve shaft is coupled for common rotation with a hub member of a planetary gear set.

14. The transmission of claim 13, wherein the planetary gear set is spaced from the input end of the main shaft by a third distance, and the third distance is greater than the second distance.

15. The transmission of claim 14, wherein the output member is coupled for common rotation with a carrier member of the planetary gear set.

16. The transmission of claim 15, comprising a second torque transmitting mechanism supported by the hub member of the planetary gear set, the second torque transmitting mechanism being engageable to selectively couple the planetary gear set for common rotation with the first gear of the second gear set.

17. The transmission of claim 16, comprising a third torque transmitting mechanism engageable to selectively couple the planetary gear set for common rotation with the main shaft.

18. The transmission of claim 17, wherein there are no gear sets that have a distance from the input end of the main shaft less than the first distance.

19. A vehicle transmission comprising
a main shaft having an input end and an output end spaced from the input end, the input end being directly connectable to a transmission input,
a plurality of main shaft gears connected for common rotation with the main shaft,
first and second countershafts spaced from and substantially parallel to the main shaft,
a plurality of first countershaft gears concentric with and rotatable about the first countershaft, each of the first countershaft gears being coplanar with and continuously intermeshing a main shaft gear,
a reverse idler gear coplanar with and continuously intermeshing one of the plurality of main shaft gears,
a plurality of second countershaft gears concentric with and rotatable about the second countershaft, each of the second countershaft gears being coplanar with a main shaft gear, wherein at least the first countershaft gears are driven by the transmission input,
a plurality of torque transmitting mechanisms and a synchronizer actuatable to provide a plurality of forward speed ratios and a reverse speed ratio between the input end and the output end of the main shaft, and
an output gear set and a planetary gear set, the output gear set having a first output gear and a second output gear, the first output gear of the output gear set and the planetary gear set being concentric with and rotatable about the output end of the main shaft to double the number of speed ratios provided between the input end and the output end of the main shaft,
wherein the plurality of countershaft gears include a first countershaft gear, a second countershaft gear, a third countershaft gear, and a fourth countershaft gear,
the plurality of main shaft gears includes a first main shaft gear, a second main shaft gear, a third main shaft gear and a fourth main shaft gear, and
the first and the second countershaft gears continuously intermesh with the first and the second main shaft gears and the third and the fourth countershaft gears continuously intermesh with the third and the fourth main shaft gears.

20. The transmission of claim 19, comprising a plurality of power take-off locations between the input end and the output end of the main shaft.

21. A transmission for use in a vehicle powertrain including a drive unit configured to provide rotational power and a torque transferring apparatus interposed between the transmission and the drive unit, the transmission comprising
a main shaft having an input end and an output end spaced from the input end, the input end of the main shaft being configured to receive torque output from the torque transferring apparatus,
a plurality of main shaft gears concentric with and in common rotation with the main shaft,
first and second countershafts spaced from and substantially parallel to the main shaft,
a plurality of countershaft gears, each countershaft gear being coupled to one of the first and second countershafts,
a plurality of torque transmitting mechanisms, each torque transmitting mechanism being coupled to one of the countershafts, each torque transmitting mechanism being selectively engageable to transfer torque to a main shaft gear and countershaft gear combination, wherein each main shaft gear and countershaft gear combination comprises a different main shaft gear and a different countershaft gear when compared with the other main shaft gear and countershaft gear combinations
wherein the plurality of main shaft gears comprises first, second, third, and fourth main shaft gears, and
the plurality of countershaft gears comprises a first countershaft gear coupled to the first countershaft and directly meshing with the first main shaft gear, a second countershaft gear coupled to the first countershaft and directly meshing with the second main shaft gear, a third countershaft gear coupled to the second countershaft and directly meshing with the third main shaft gear, and a fourth countershaft gear coupled to the second countershaft and directly meshing with the fourth main shaft gear.

22. The transmission of claim 21,
wherein the plurality of torque transmitting mechanisms are selectively engageable to provide a first transmission operating range in which the transmission output is determined by the first main shaft gear and the first countershaft gear, a second transmission operating range in which the transmission output is determined by the second main shaft gear and the second countershaft gear, a third transmission operating range in which the transmission output is determined by the third main shaft gear and the third countershaft gear.

23. The transmission of claim 22, wherein the plurality of torque transmitting mechanisms comprises first, second, and third torque transmitting mechanisms, wherein the first torque transmitting mechanism is selectively engageable to provide the first transmission operating range, the second torque transmitting mechanism is selectively engageable to provide the second transmission operating range, and the third torque transmitting mechanism is selectively engageable to provide the third transmission operating range.

24. The transmission of claim 23, wherein the first and second torque transmitting mechanisms are coupled to the first countershaft and the third torque transmitting mechanism is coupled to the second countershaft.

25. The transmission of claim 23, wherein the plurality of torque transmitting mechanisms comprises a fourth torque transmitting mechanism coupled to the second countershaft, and the fourth torque transmitting mechanism is selectively engageable to provide a fourth operating range in which the transmission output is determined by the fourth main shaft gear and the fourth countershaft gear.

* * * * *